United States Patent Office 3,244,656
Patented Apr. 5, 1966

3,244,656
PAINTS
George Albert de Mejer, 20 Marlborough Ave.,
Hessle, East Yorkshire, England
No Drawing. Filed Sept. 15, 1960, Ser. No. 56,321
Claims priority, application Great Britain, Sept. 16, 1959,
31,620/59
5 Claims. (Cl. 260—29.6)

This invention relates to paints used as protective coatings, and its purpose is the production of a paint which can be used as a rust remover and primer in one coat. It can be applied to a rusty surface and it is not even necessary that the surface should be dry.

The paints employ at least 30 percent by weight of extremely finely divided metallic lead and incorporate it with at least 15 percent by weight of phosphoric acid in a solution of plastic resin. It is believed that the phosphoric acid neutralises rust present on the surface by converting it into iron phosphate which then becomes an integral part of the coating, while the metallic lead acts as a rust-inhibiting pigment.

An appropriate plastic is poly-2-ethoxethyl methacrylate, which may be dissolved in ethyl alcohol and isopropanol, with a small percentage of water.

Although the rust inhibiting properties of metallic lead are known, as also is the use of phosphoric acid in the neutralisation of rust, it has not been possible until this invention to combine the properties of these two materials into one coating.

It is important that the metallic lead should be extremely finely divided (atomised) and should not be allowed to oxidise and should be stored immersed in a liquid before incorporation in the paint. Suitable liquids are odorless white spirit, water or plasticisers such as a chlorinated di-phenyl.

Up to about 5 percent of suspending and water absorbing agents can be used such as bentonite, mica, alkyl ammonium montmorillonite, as also can small percentages of pigments such as titanium dioxide for the purpose of altering the colour, but these materials are not essential to the invention.

An example of a primer in accordance with the invention is as follows:

| | Parts by weight |
|---|---|
| Metallic lead and suspending agents | 387 |
| Phosphoric acid | 200 |
| Plastic resin | 70 |
| Solvents | 327 |
| Plasticiser | 12 |

In the above example the constituents and proportions are not critical but all ingredients must be stable to phosphoric acid and it is desirable to maintain a metallic lead content of at least 30 percent by weight while the phosphoric acid content should not fall below 15 percent by weight. However, as little as 20% of lead and 5% of phosphoric acid could be beneficial where rusting and liability to rust are not severe.

The solvent may comprise about three parts of ethyl alcohol to one part of isopropanol with 3 to 5 percent of water calculated on the alcohol mixture.

The plastic resin, namely poly-2-ethoxethyl methacrylate can have the addition of up to 20 percent plasticiser, i.e., trixylenyl phosphate.

The metallic lead content can be considerably increased, but satisfactory results are obtained with the above stated proportions and higher proportions add to the cost.

The best method of manufacture of the paint has been found to be to make a 50 percent solution of the poly-2-ethoxethyl methacrylate in 85 percent isopropanol and 15 percent water. The metallic lead dispersed in a chlorinated di-phenyl plasticiser is then mixed with this solution. This is then thinned with ethyl alcohol in the form of methylated spirits. The phosphoric acid is now added with thorough stirring; finally mica or other suspending agent is slowly added with thorough stirring. The resulting mixture should be filled into a suitably lacquered tin.

While a coating of the paint will be effective with rust up to about 1/1000 inch thick upon the surface to be protected, it is obviously desirable if there is rust in excess of this to remove it by brushing with a stiff bristle brush or light wire brush.

It is possible to use polyvinyl acetate in lieu of poly-2-ethoxethyl methacrylate and in about the same proportion, but some loss of stability results. If polyvinyl acetate is used the isopropanol and water are replaced by ethyl alcohol, and the paint should be used within two weeks of manufacture.

I claim:

1. A paint consisting of at least 30 percent by weight of extremely finely divided metallic lead free from surface oxide, at least 15 percent by weight of phosphoric acid and the remainder a solution of poly-2-ethoxethyl methacrylate in a mixture of about three parts of ethyl alcohol to one part of isopropanol with water.

2. A paint consisting of at least 30 percent by weight of extremely finely divided metallic lead free from surface oxide, at least 15 percent by weight of phosphoric acid and the remainder a solution of poly-2-ethoxethyl methacrylate in a mixture of about three parts of ethyl alcohol to one part of isopropanol with 3 to 5 percent of water calculated in the alcohol mixture.

3. A paint as set forth in claim 2 also containing up to about 5 percent of a suspending and water absorbing agent selected from the group consisting of bentonite, mica, and alkyl ammonium montmorillonite.

4. A paint of the following composition:

| | Parts by weight |
|---|---|
| Extremely finely divided metallic lead free of surface oxide with a very small percentage of a suspending agent | 387 |
| Phosphoric acid | 200 |
| Poly-2-ethoxethyl methacrylate | 70 |
| Solvent comprising about three parts of ethyl alcohol to one part of isopropanol with 3 to 5 percent water | 327 |
| Plasticiser | 12 |

5. A method of manufacturing a paint comprising the steps of making a 50 percent solution of poly-2-ethoxethyl methacrylate in 85 percent isopropanol and 15 percent water, admixing a dispersion of extremely finely divided metallic lead free of surface oxide dispersed in a chlorinated diphenyl plasticiser, in quantity to provide a lead content of at least 30 percent by weight referred to the total contents of the paint, thinning the mixture with ethyl alcohol in amount about three times the isopropanol, adding phosphoric acid with thorough stirring in quantity to constitute at least 15 percent by weight referred to the total contents of the paint, and slowly adding a small proportion of a suspending agent with thorough stirring.

References Cited by the Examiner

UNITED STATES PATENTS

| | | | |
|---|---|---|---|
| 2,129,694 | 9/1938 | Izard | 260—86.1 |
| 2,225,303 | 12/1940 | Iliff et al. | 260—762 |
| 2,385,800 | 10/1945 | Douty | 148—6.15 |
| 2,725,310 | 11/1955 | McBride | 148—6.15 |
| 2,795,564 | 6/1957 | Conn | 260—29.6 |
| 2,858,230 | 10/1958 | Knoll et al. | 260—29.6 |
| 2,959,464 | 11/1960 | Craig | 260—29.7 |
| 3,097,118 | 7/1963 | Leonard | 148—6.15 |

FOREIGN PATENTS 657,867   9/1951   Great Britain.

OTHER REFERENCES

Singer, "Fund of Paint, Varnish and Lacquer Tech.," The American Paint Journal Co., St. Louis, Mo., 1957, pp. 169–171, 178 and 179.

Benett, "Paint Technology," vol. 3, pp. 153–156, (May 1938).

Burns et al., "Protective Coatings for Metals," p. 416 (Reinhold, 1955).

Mattiello, "Protective and Decorative Coatings," vol. II, John Wiley & Sons, 1942, pp. 603–610.

MURRAY TILLMAN, *Primary Examiner.*

DANIEL ARNOLD, JAMES A. SEIDLECK, *Examiners.*

B. S. LEON, E. M. OLSTEIN, N. F. OBLON,
*Assistant Examiners.*